US012600575B2

(12) United States Patent
Hampe

(10) Patent No.: US 12,600,575 B2
(45) Date of Patent: Apr. 14, 2026

(54) CONVEYOR DEVICE

(71) Applicant: Interroll Holding AG, Sant' Antonino (CH)

(72) Inventor: Andreas Hampe, Hückelhoven (DE)

(73) Assignee: Interroll Holding AG, Sant'Antonino (CH)

( * ) Notice: Subject to any disclaimer, the term of this patent is extended or adjusted under 35 U.S.C. 154(b) by 161 days.

(21) Appl. No.: 18/289,226

(22) PCT Filed: May 6, 2022

(86) PCT No.: PCT/EP2022/062351
§ 371 (c)(1),
(2) Date: Nov. 2, 2023

(87) PCT Pub. No.: WO2022/234124
PCT Pub. Date: Nov. 10, 2022

(65) Prior Publication Data
US 2024/0253908 A1 Aug. 1, 2024

(30) Foreign Application Priority Data
May 7, 2021 (DE) .......................... 102021111944.8

(51) Int. Cl.
*B65G 43/08* (2006.01)
*B65G 47/31* (2006.01)

(52) U.S. Cl.
CPC ............. *B65G 43/08* (2013.01); *B65G 47/31* (2013.01); *B65G 2203/042* (2013.01)

(58) Field of Classification Search
CPC .................................................... B65G 43/08

USPC ....................................................... 198/464.1
See application file for complete search history.

(56) References Cited

U.S. PATENT DOCUMENTS

| | | | | |
|---|---|---|---|---|
| 6,471,039 | B1 * | 10/2002 | Bruun | B65G 37/02 |
| | | | | 198/577 |
| 7,277,773 | B2 * | 10/2007 | Speckhart | G07F 17/12 |
| | | | | 198/465.4 |
| 7,631,747 | B2 | 12/2009 | Zeitler | |

(Continued)

FOREIGN PATENT DOCUMENTS

| | | |
|---|---|---|
| DE | 10236170 A1 | 3/2004 |
| DE | 102004038135 B4 | 3/2014 |
| DE | 102015107167 A1 | 11/2016 |

*Primary Examiner* — Gene O Crawford
*Assistant Examiner* — Lester Rushin, III
(74) *Attorney, Agent, or Firm* — Biotech Beach Law PC; Raymond Wagenknecht

(57) ABSTRACT

The invention relates to a conveyor device for conveying conveyed objects along a conveyor line, comprising a first conveyor zone, which constitutes a first segment of the conveyor line, and which comprises a first conveyor drive for generating a driving or conveying force braking force on a conveyed object located in the first conveyor zone, a first control unit which is connected to the first conveyor drive in terms of signaling and is designed to control the first conveyor drive with first conveyor parameters selected from: first conveying speed, first conveying acceleration or deceleration, first conveying duration. The invention is characterised in that the first control unit is adapted to transmit the first parameter of conveyed object to the third control unit via the second signal transmission path.

16 Claims, 3 Drawing Sheets

(56)                     References Cited

U.S. PATENT DOCUMENTS

| 7,756,603 | B1 * | 7/2010 | Delaney, III | ......... | H01R 25/145 |
| | | | | | 198/459.8 |
| 8,983,651 | B2 * | 3/2015 | Combs | ............... | G05B 19/4189 |
| | | | | | 700/230 |
| 10,889,451 | B2 | 1/2021 | Klueber et al. | | |
| 11,059,676 | B2 * | 7/2021 | Nitzberg | .............. | B65G 47/261 |
| 11,718,483 | B2 * | 8/2023 | Heinen | ................... | H04L 12/40 |
| | | | | | 198/464.2 |
| 11,814,248 | B2 * | 11/2023 | Ramesh | ................. | B65G 43/02 |
| 12,134,526 | B2 * | 11/2024 | Nitzberg | .............. | B65G 47/261 |
| 2004/0075405 | A1 * | 4/2004 | Brixius | ................. | B65G 47/31 |
| | | | | | 318/268 |
| 2015/0151921 | A1 | 6/2015 | Collot | | |

* cited by examiner

CONVEYOR DEVICE

CROSS REFERENCE TO RELATED APPLICATIONS

This application is the U.S. national stage of International Application No. PCT/EP2022/062351, filed on 2022 May 6. The international application claims the priority of DE 102021111944.8 filed on 2021 May 7; all applications are incorporated by reference herein in their entirety.

BACKGROUND

The invention relates to a conveyor device for conveying conveyed objects along a conveyor line.

Conveyor devices of this type are used for various intralogistic applications for conveying goods or other conveyed objects. Another application of such conveyor devices is the conveying of components and products to be assembled in a production facility and the conveying of components to production stations therein.

For efficient conveying, the conveyor lines in such conveyor devices are divided into several sub-units, so-called conveyor zones. Each conveyor zone has a conveyor drive that can be individually controlled and thus determines the conveying speed of a conveyed object in this conveyor zone. A conveyor drive can be formed, for example, by a conveyor roller with an integrated motor on which the conveyed object rests directly and is set in motion by the conveyor roller. A conveyor drive can also be formed by a drive motor that drives a conveyor belt. A conveyor zone is defined as an area which is driven by such a conveyor drive and in which a conveyed object is then conveyed by this conveyor drive. This area can be of different sizes, for example the area can comprise the extension of an endless conveyor belt driven by a conveyor drive, or it is an area covered by a motor-driven conveyor roller, possibly supplemented by idle rollers driven by this motor-driven conveyor roller by drive belts. A conveyor zone can also have several synchronously operated conveyor drives in order to apply a higher conveying force to a conveyed object located in the conveyor zone.

For the efficient conveyance of conveyed objects along such a conveyor line with a high throughput rate, two different conveyor modes are basically known. On the one hand, the conveyor line can be operated in the so-called single-place take-off mode. In the single-place take-off mode, a conveyed object is conveyed from a conveyor zone into the conveyor zone downstream of it if this downstream conveyor zone is free. In single-place take-off mode, the conveyed objects in the individual conveyor zones are usually started with a time delay, since the conveyor zone upstream can also continue conveying its conveyed object once the conveyed object from one conveyor zone has been completed.

On the other hand, the conveyor line can be operated in the so-called block discharge mode. In block take-off mode, all conveyor zones are started simultaneously so that the conveyed objects in them move synchronously into the respective downstream conveyor zone. In principle, the block take-off mode can achieve a more constant operation of the conveyor drives than the single-place take-off. However, both single-place take-off and block take-off often require a correction by temporarily decelerating individual conveyed objects, since the conveyed objects cannot necessarily all be accelerated and decelerated synchronously. This occurs in particular when several conveyed objects with different weights or dimensions are conveyed along the conveyor line and leads to an additional load on the conveyor drives.

In order to design the control of conveyor drives accordingly, it is known to connect conveyor drives with corresponding control units. One control unit can control a single conveyor drive. However, control units can also be provided to which several conveyor drives can be connected and which individually control several conveyor drives, for example two or four conveyor drives. The control unit can also be designed as a central control unit for controlling all conveyor drives or a larger number of conveyor drives in the conveyor device. In this case, corresponding virtual control units for one, two or more conveyor drives can be provided in the central control unit, which in turn communicate with each other in the central control unit.

On the one hand, communication between the control units is important because it allows the control units to exchange signals that indicate, for example, whether an upstream or downstream conveyor zone is currently conveying or at a standstill. Furthermore, sensors can be connected to the control units which signal information from the respective conveyor zone to the control unit. Typically, such a sensor can be, for example, a light barrier which measures transversely to the conveying direction and which can detect the beginning or the end of a conveyed object and from this can determine the length, the speed and/or the position of the conveyed object. The signals from such sensors are also transmitted to the control unit and can be used to control the conveyor drive in the respective conveyor zone of the sensor or to control a conveyor drive in a subsequent or preceding conveyor zone.

In principle, it is desirable to be able to transport the highest possible throughput rate of conveyed objects per unit of time through such a conveyor line. However, it must be ensured that so-called zero pressure accumulation conveying takes place, i.e. conveying in which the conveyed objects do not come into contact with each other, as such contact can have such an effect due to the amplification of the conveying forces that a conveyed object lying far downstream is damaged by this due to the addition of the conveying forces. Zero pressure accumulation conveying is achievable in single place take-off mode and block take-off mode, whereby certain safety distances between the conveyed objects must be maintained, as often, due to a correspondingly simple sensor equipment, a distance between the conveyed objects is established in each conveyor zone, which corresponds to the length of the conveyor zone minus the length of the conveyed object. Through the interaction of sensor and drive control of the conveyor drive by the control unit, reliable zero pressure accumulation conveying can be achieved even at high conveying speeds. However, the achievable throughput through the conveyor line is not yet optimal due to the safety distances to be maintained, which cannot be reduced at will.

DE 102 36 170 A1 discloses a load-dependent asynchronous drive for a conveyor line. A sensor system is used to detect the effects of the load-dependent speed of the drive motors and to determine the influence of the load on the conveying speed via a closed loop control system. Control Loop Regulated.

U.S. Pat. No. 10,889,451 B2 discloses an accumulating conveyor comprising a first zone upstream of a second zone, and wherein the second zone is upstream of a third zone. A second control module associated with the second zone receives a third feedback signal indicating that a third sensor is blocked from a third control module associated with the third zone. The second control module places a second drive assembly associated with the second zone in a disengaged state and receives a first signal from a first control module associated with the first zone. The first signal indicates that either a first item with an irregular boundary or a second item with a regular boundary is exiting the first zone. The second control module controls the second drive assembly and a second brake assembly based on the indication by the first signal.

DE 10 2004 038 135 B4 discloses a zone-controlled conveyor system. Here, a zone controller starts operation of a drive roller in a predetermined zone at a first speed while conveying an article from the predetermined zone to a downstream zone is prohibited when the article is detected in a zone directly upstream of the predetermined zone to receive the articles conveyed from the upstream side. After the item arrives at a predetermined position in the designated zone, the zone controller operates the drive roller at the second conveying speed. When an item is detected by the sensor in the designated zone, the zone control stops the operation of the drive roller.

US 2015/0151921 A1 discloses a conveyor system comprising a plurality of successive modules. Each module includes a control device connected to and controlling at least one zone. Each control device includes a communication device for communicating with control devices in adjacent modules. The control devices implement a mechanism for relaying and enriching quantitative segment information from the two end zones of the conveyor segment, thereby providing information for each zone.

SUMMARY

The invention relates to a conveyor device for conveying conveyed objects along a conveyor line, comprising a first conveyor zone, which constitutes a first segment of the conveyor line, and which comprises a first conveyor drive for generating a driving or conveying force braking force on a conveyed object located in the first conveyor zone, a first control unit which is connected to the first conveyor drive in terms of signaling and is designed to control the first conveyor drive with first conveyor parameters selected from: first conveying speed, first conveying acceleration or deceleration, first conveying duration. The invention is characterised in that the first control unit is adapted to transmit the first parameter of conveyed object to the third control unit via the second signal transmission path.

DETAILED DESCRIPTION

The invention is based on the task of providing a conveyor device which achieves a more efficient throughput of conveyed objects through such a conveyor line.

This task is solved according to the invention by a conveyor device of the aforementioned type, comprising:
   a first conveyor zone which represents a first segment of the conveyor line and which has a first conveyor drive for generating a driving or braking force on a conveyed object located in the first conveyor zone, a first control unit which is connected to the first conveyor drive in terms of signaling and is designed to control the first conveyor drive with first conveyor parameters selected from: first conveying speed, first conveying acceleration or conveying deceleration, first conveying duration, a second conveying zone which is arranged within the conveyor line downstream of the first conveying zone and represents a second segment of the conveyor line, and which has a second conveyor drive for generating a driving or braking force on a conveyed object located in the second conveying zone, a second control unit which is connected to the second conveyor drive in terms of signaling and is designed to control the second conveyor drive with second conveying parameters, selected from: second conveying speed, second conveying acceleration or conveying deceleration, second conveying duration, a signal transmission path between the first and the second control unit, characterised in that the first control unit is designed to receive a conveyor signal from the first conveyor zone detected during the conveying of a conveyed object through the first conveyor zone, processing the conveyor signal and determining therefrom a first parameter of conveyed object describing the conveying behavior of this conveyed object in the first conveyor zone and transmitting this first parameter of conveyed object to the second control unit via the signal transmission path, and the second control unit is designed to receive the first parameter of conveyed object from the first control unit via the signal transmission path and to set at least one of the second conveyor parameters as a function of this first parameter of conveyed object and to convey the conveyed object with this second conveyor parameter in the second conveyor zone.

According to the invention, the conveyor device comprises at least two conveyor zones, and conveyor devices according to the invention will regularly comprise a plurality of conveyor zones arranged one behind the other in a conveyor line. Each conveyor zone has a conveyor drive that can be controlled by a control unit. The control unit can individually control several conveyor drives of correspondingly several conveyor zones, for example two or four conveyor drives. However, a control unit can also be provided for a single conveyor drive of a conveyor zone.

The control units are interconnected for signal transmission. In terms of signaling, one control unit can be connected to the upstream and downstream control unit of the corresponding upstream and downstream conveyor zone, but all control units can also be connected to each other, for example, the control units can be connected in terms of signaling by bus-controlled signal transmission. If a single multiple control unit controls several conveyor drives individually, it is to be understood that within this multiple control unit corresponding individual control units are physically or virtually formed, which are also connected to each other for signal transmission, so that the control units of each conveyor drive integrated into the multiple control unit are capable of data exchange with each other.

According to the invention, a control unit controls a conveyor drive in order to control its drive behavior. This drive behavior of the conveyor drive can include the speed, the acceleration or deceleration of the conveyor drive, the drive energy or the like. The control unit can also receive signals from the conveyor drive in order, for example, to set a specific speed in a closed-loop control or to set a specific rate of change of the speed (acceleration) or in order to set a constant conveying speed under changing loads on the conveyor drive by a conveyed object. In principle, the control unit can therefore control the conveyor drive or regulate it in such a closed control loop.

According to the invention, it is provided that the control unit receives a conveyor signal from the conveyor zone. This conveyor signal can, for example, be transmitted from the conveyor drive to the control unit and then represent, for example, a speed, a speed change, a discontinuity in an acceleration or deceleration, a motor current, a motor current curve or a discontinuity in a motor current curve. The conveyor signal can also originate directly from signals or data present in the control unit, so that an actual physical transmission from the conveyor drive to the control unit does not take place, but the conveyor signal originates in the control unit itself during the conveying process of the conveyed object and is transmitted in this sense. The conveyor signal can also originate from a sensor in the conveyor zone that is connected to the control unit in terms of signaling and then signal, for example, the beginning or the end of a conveyed object. The conveyor signal can also be a conveyor signal composed of such a sensor signal and a signal from the conveyor drive, which thus includes, for example, a speed of the conveyor drive derived from the speed of the conveyor drive and a speed of the conveyed object derived from the signals of the sensor, or includes a difference between these two speeds.

A parameter of conveyed object is generated in the control unit from the conveyor signal. This parameter of conveyed object is a parameter assigned to the respective conveyed object in the conveyor zone, which thus describes a behavior or property of the conveyed object during conveying in the respective conveyor zone. This parameter of conveyed object can be for example a mass of the conveyed object derived from the drive force and acceleration of the conveyed object. The parameter of conveyed object can also describe other properties related to the conveyed object alone, for example the length of the conveyed object in conveying direction or the weight distribution of the conveyed object over the length of the conveyed object.

These parameters of conveyed object can be determined from the conveyor signals, in particular from conveyor signals transmitted to the control unit by the conveyor drive and/or the sensor in the conveyor zone. In the simplest case, the parameter of conveyed object can be or include the conveyor signal itself, for example if a maximum current of the conveyor drive already provides a suitable statement about a conveying behavior as a parameter of conveyed object. The parameter of conveyed object can also describe properties of the respective conveyed object in the conveyor zone, for example a friction coefficient or adhesion coefficient of the conveyed object on the conveyor drive, which can be calculated on the basis of a speed difference between the conveyed object and the conveyor drive, an acceleration, a force or a determined mass of the conveyed object. The parameter of conveyed object thus describes a conveying behavior of the conveyed object in the respective conveyor zone or a property of the conveyed object that is relevant for this conveying behavior and that was determined in the first conveyor zone.

This parameter of conveyed object is transmitted to a control unit of a second, downstream conveyor zone. If two or more conveyor drives are individually controlled by a single control unit, this transmission can take place within the control unit itself, or can take place within a central control unit that controls a large number or all of the conveyor zones of a conveyor device, or can take place between two decentralized control units mounted at a distance along the conveyor line via a corresponding signal connection. The control unit of the downstream conveyor zone thus receives specific information about the conveyed object.

The second control unit can use this received parameter of conveyed object to determine or change conveyor parameters of the second conveyor drive. This means that the second control unit changes a conveyor parameter determined in a previous programming, for example a speed or acceleration of the conveyor drive, in order to better adapt this conveyor parameter to the conveyed object. For example, if the parameter of conveyed object describes that an undesired slip has occurred during the acceleration of the conveyed object in the first conveyor zone, it can reduce the acceleration in the second conveyor zone in order to achieve a low-wear and efficient conveyance of the conveyed object without slip in the second conveyor zone. Such an instruction for slip reduction can also already be transmitted as a parameter of conveyed object from the first to the second control unit.

The second control unit can also initially determine the conveyor parameters for the conveyed object on the basis of the parameter of conveyed object if no conveyor parameter for conveying the conveyed object has been set beforehand. In doing so, the second control unit can take into account the parameter of conveyed object on the one hand, and other specifications on the other hand, which signal, for example, whether the subsequent conveyor zone downstream of the second conveyor zone is occupied or free, whether the distance to a conveyed object in front should be shortened or lengthened, and accordingly define the conveyor parameters for the second conveyor drive.

According to the invention, it is therefore possible for the conveyor parameters of the downstream conveyor zone to be adjusted in direct response to a behavior or properties of the conveyed object by determining such a property in the first conveyor zone, transmitting it to the second, downstream conveyor zone and the second conveyor zone then adjusting its conveyor parameters accordingly on the basis of this property.

On the one hand, the conveyor device according to the invention makes it possible for very different conveyed objects to be conveyed along a conveyor line and for each conveyor zone to take into account the individual properties of a single conveyed object in the conveyor parameters. For example, very light and very heavy conveyed objects can be conveyed and the mass of the conveyed objects is taken into account in the conveyor parameters in such a way that in both cases a slip-free acceleration or deceleration is achieved for both conveyed objects and thus the distance between the two conveyed objects is kept constant. Furthermore, the invention enables the conveyor zones along a conveyor line to react to changing properties of a conveyed object along the conveyor line and to adjust their conveyor parameters accordingly. For example, if due to a polishing effect on the underside of a conveyed object or a roughening effect on the underside of a conveyed object, the coefficient of friction between the conveyed object and the respective conveyor drives decreases or increases, the corresponding conveying force or acceleration on the conveyed object along the conveyor line can be reduced or increased to accommodate these changing properties of the conveyed object. Another influence on a conveyed object can be, for example, a change in static friction caused by liquid, a shift in weight within the conveyed object due to slipping contents and the like, each of which can be detected as a conveyor signal and transmitted to control units of downstream conveyor zones so that these downstream conveyor zones can adjust their conveyor parameters accordingly. The invention therefore achieves efficient conveying adapted to the individual characteristics of a conveyed object, thereby enabling the conveyed objects to be compacted on the conveyor line at high conveying speeds and high accelerations of the conveying speed at the same time, without the risk that no accumulation pressure-free conveying takes place.

A first example of a conveyor device according to the invention can consist, for example, of a conveyed object being conveyed into a first conveyor zone, the conveyor drive accelerating the conveyed object with a first acceleration in this first conveyor zone and transmitting the conveying energy required for this as a current intensity to the first control unit as a conveyor signal. The first control unit transmits this current intensity as a parameter of conveyed object to the second control unit. In this case, the current strength signals a mass of the conveyed object as a parameter of conveyed object. The second control device then controls the second conveyor drive in the second conveyor zone with conveyor parameters that are optimized based on this conveyed object parameter.

This control takes place when the conveyed object passes from the first conveyor zone into the second conveyor zone and is conveyed there. The second conveyor zone can be located directly adjacent to the first conveyor zone or further downstream from the first conveyor zone. The optimization can consist, for example, of the second conveyor drive accelerating the conveyed object with a longer conveying duration at a lower current and a lower but longer acceleration in order to achieve an energy-saving acceleration.

A second example can be that a sensor detects the beginning and the end of the conveyed object from the first conveyor zone and sends it as a conveyor signal to the first control device. The first control device transmits this data, which characterizes the length of the conveyed object as a parameter of conveyed object, to the second control device, which then sets a distance between this first conveyed object and a preceding or following conveyed object to a minimum distance precisely on the basis of the length of the conveyed object by decelerating or accelerating the conveyed object accordingly.

A third example may be implemented in such a way that the speed of the conveyed object detected by a sensor and the speed of the conveyor drive are used to determine that a slip has occurred between the conveyor drive and the conveyed object in the first conveyor zone. The conveyor signal then comprises these sensor signals and the conveyor drive signal and is transmitted to the first control unit. The first control unit transmits a signal characterising this slip as a parameter of conveyed object to the second control unit. The second control unit can then reduce the acceleration of the conveyed object or the deceleration of the conveyed object in order to achieve slip-free acceleration or deceleration of the conveyed object in the second conveyor zone.

According to a first preferred embodiment, it is provided that the conveyor signal comprises a drive signal from the first conveyor drive, in particular selected from a maximum rotational speed of the conveyor drive, an average rotational speed of the conveyor drive, a speed of alteration rate of the rotational speed over time, a speed of alteration rate speed over time, a maximum drive energy of the conveyor drive, an average drive energy of the conveyor drive, a speed of alteration rate of the drive energy of the conveyor drive over time, a speed of alteration rate speed of the drive energy of the conveyor drive over time. According to this embodiment, the conveyor drive sends a conveyor signal characterising a conveying property of the conveyed object in the first conveyor zone to the first control unit. This drive signal may, for example, consist of the maximum or average speed of the conveyor drive during conveyed object conveyance. The drive signal can also be a speed change rate, i.e. an acceleration of the conveyor drive. Furthermore, a speed of alteration rate of the rotational speed can also be transmitted as a drive signal. This is to be understood as the change in the acceleration of the conveyor drive over time, from which, for example, a discontinuity in the acceleration would be recognizable, which would indicate a break in the static friction between the conveyor drive and the conveyed object and consequently signal an undesired slip.

The drive signal can also contain a characterization of the drive energy, also as maximum or average drive energy, as alteration rate of the drive energy or as speed of alteration rate of the drive energy. For example, the current strength of the conveyor drive can serve as the drive energy, which already characterizes the drive energy alone if the voltage is constant in this respect, but if necessary also characterizes the drive energy in connection with the voltage if the voltage changes. Since the drive energy is often supplied via the first control unit, the drive energy can be received or detected directly by the control unit as a drive signal from the connecting line between the control unit and the conveyor drive.

According to a further preferred embodiment, it is provided that the first conveyor zone comprises a conveyor sensor which is designed to detect a position, speed and/or acceleration of the conveyed object in the first conveyor zone, and which comprises conveyor parameters as a sensor signal describing the position, speed and/or acceleration of the conveyed object in the first conveyor zone. According to this embodiment, the conveyor zone comprises a conveyor sensor whose signals are included in the conveyor signal. Such a conveyor sensor can be, for example, a single light barrier or a double light barrier, which, in addition to a position detection, also enables a speed detection. The sensor can also be designed as a force sensor for detecting the weight of the conveyed object. The conveyor sensor can also be designed as an advanced image acquisition device, for example as a digital camera unit, and can use the acquired image data to acquire information about the conveyed object and its conveying behavior (speed, acceleration, tilt) in the conveyor zone by means of image evaluation.

The conveyor parameters detected by the conveyor sensor make it possible to generate a conveyor signal on their own, as explained above, or can form such a conveyor signal in combination with other data, for example from the conveyor drive, as explained above, and thereby produce a conveyor characteristic of the conveyed object in the conveyor zone.

It is even more preferred if the first control unit is designed to transmit the first parameter of conveyed object to the second control unit before the conveyed object has completely left the first conveyor zone. According to this embodiment, the first parameter of conveyed object is transmitted to the second control unit as long as at least a small portion of the conveyed object is still in the first conveyor zone. The conveyed object may have already partially reached the second conveyor zone at this point. Nevertheless, this transmission at this point enables the control unit of the second conveyor zone to adjust the conveyor parameter(s) in such a way that the conveyed object is conveyed in the second conveyor zone in an optimised manner on the basis of the parameter of conveyed object received from the first control unit.

Alternatively to this embodiment, the first parameter of conveyed object can be transmitted to the second control unit before the conveyed object has reached the second conveyor zone or before the conveyed object is conveyed by a conveyor drive of the second conveyor zone. This possibly earlier point in time of the transmission of the parameter of conveyed object ensures that the conveyed object can be conveyed in the second conveyor zone completely under consideration of the first parameter of conveyed object.

The conveyor device can be further advanced by a third conveyor zone arranged downstream of the second conveyor zone, comprising a third conveyor drive and a third control unit, which is connected to the first and/or the second control unit via a second signal transmission path is connected and is designed to control the third conveyor drive with third conveyor parameters selected from: third conveying speed, third conveying acceleration or conveying deceleration, third conveying duration, wherein the first control unit is adapted to transmit the first parameter of conveyed object to the third control unit via the second signal transmission path and/or the second control unit is adapted to transmit the second parameter of conveyed object to the second signal transmission path, to receive a conveyor signal from the second conveyor zone detected during the conveying of a conveyed object through the second conveyor zone, and to determine therefrom a second parameter of conveyed object describing the conveying behaviour of this conveyed object in the second conveyor zone and to transmit this second parameter of conveyed object to the third control unit via the signal transmission path, the second control unit is designed to receive the parameter of conveyed object from the first control unit and/or the second parameter of conveyed object from the second control unit via the signal transmission path and to set at least one of the third conveyor parameters as a function of the parameter of conveyed object and/or the second parameter of conveyed object and to convey the conveyed object with this third conveyor parameter in the third conveyor zone.

According to this further development, a conveyor signal is also detected in the second conveyor zone and transmitted as a parameter of conveyed object to a third control unit for a third conveyor zone. In principle, this defines the control architecture in that the second control unit first receives a parameter of conveyed object and also adjusts or determines a conveyor parameter for conveying the conveyed object in the second control zone on the basis of this parameter of conveyed object. However, the second control unit also detects a conveyor signal that originates from the second conveyor zone and was consequently detected when the conveyed object was conveyed with these adjusted or set conveyor parameters in the second conveyor zone. A second parameter of conveyed object is then determined from this conveyor signal from the second conveyor zone, which is transmitted to a control unit of a third conveyor zone. On the one hand, this control architecture enables the conveyor parameters to be continuously adapted to the conveyed object.

For example, the second parameter of conveyed object can be used to further optimise the conveyor parameters, for example if the adjustment of the conveyor parameters based on the (first) parameter of conveyed object has not yet led to an optimal conveyance of the conveyed object. It is also possible that the third control unit is designed to receive both the (first) parameter of conveyed object and the second parameter of conveyed object and to determine a conveyor parameter for conveying the conveyed object in the third conveyor zone on the basis of a comparison, for example a difference, between these two parameters of conveyed object. In this way, a change in the parameter of conveyed object can be taken into account and a more precise adjustment of the conveyor parameters can be made.

It is to be understood that the conveyor device according to the invention detects a conveyor signal, in particular in more than two conveyor zones, in particular, for example, in every conveyor zone or every second or every third or every nth conveyor zone, and forms and transmits a parameter of conveyed object from this in each case. In this way, the conveyor parameters can be optimised along the entire conveyor line in the conveyor device and any changes in the conveyed object or its conveying characteristics along the entire conveyor line can be taken into account.

In this context, it is further particularly preferred if the second control unit is designed to determine the difference between the first and the second parameter of conveyed object, to determine an alteration parameter of conveyed object on the basis of the difference, and to transmit the alteration parameter of conveyed object to the third control unit, or the third control unit is designed to determine the difference between the first and the second parameter of conveyed object, to determine an alteration parameter of conveyed object on the basis of the difference, the third control unit being designed to set at least one of the third conveyor parameters as a function of the alteration parameter of conveyed object and to convey the conveyed object with this third conveyor parameter in the third conveyor zone.

According to this embodiment, the third control unit is configured to adjust one or more of the third conveyor parameters in dependence on an alteration parameter of conveyed object. This alteration parameter of conveyed object is determined by comparing the first and the second parameter of conveyed object, whereby this comparison can be carried out in the second control unit or in the third control unit and accordingly either the alteration parameter of conveyed object is transmitted from the second control unit to the third control unit or the alteration parameter of conveyed object is transmitted directly in the third control unit.

It is further preferred if the first or second parameter of conveyed object describes a length of the conveyed object in a direction extending along the conveyor line, a mass or weight of the conveyed object, and/or a coefficient of friction between a contact surface of the conveyed object on the first or second conveyor drive and the first or second conveyor drive. According to this form of development, the parameter of conveyed object describes one or more properties of the conveyed object or characteristics of the conveying behaviour of the conveyed object that are particularly relevant for conveying. The length of the conveyed object in the conveying direction is particularly important for determining the conveying duration, i.e. the time over which a conveyor drive can transmit a force to the conveyed object. The mass of the conveyed object, which also has the effect of a weight force of the conveyed object, is important on the one hand for the transferable friction force from the conveyor drive to the conveyed object, and on the other hand for the necessary force with which the conveyed object must be driven by the conveyor drive for a certain acceleration. The coefficient of friction describes the relationship between a driving force in the conveying direction and a contact force of the conveyed object perpendicular to it. The coefficient of friction can change in particular due to changes in the surface of the conveyed object or the contact surface of the conveyor device for the conveyed object, but can also be changed by dirt or the effect of liquids.

According to a further preferred embodiment, the second control unit is designed to set the second conveyor parameter such that a slip between the second conveyor drive and the conveyed object in the second conveyor zone is less than a slip between the first conveyor drive and the conveyed object in the first conveyor zone, and/or the third control unit is designed to set the third conveyor parameter such that a slip between the third conveyor drive and the conveyed object in the third conveyor zone is less than a slip between the second conveyor drive and the conveyed object in the second conveyor zone.

According to this advanced design, the conveyor parameter in the second or third conveyor zone is optimised by the second or third control unit in such a way that any slip previously observed between the conveyor drive and the conveyed object in the first or second conveyor zone is reduced as a result. In this context, slip is to be understood as a difference in speed between the conveyor drive and the conveyed object, which consequently generates a relative movement between the conveyor drive and the conveyed object. On the one hand, such a relative movement can consist of the conveyor drive moving faster than the conveyed object, i.e. an excessively high conveyor drive speed or acceleration of the conveyor drive that the conveyed object cannot follow. Conversely, the conveyed object can also move faster than the conveyor drive, if a deceleration of the conveyed object, i.e. a deceleration, is to be caused by the conveyor drive. In this case, the conveyed object slips over the slower-moving conveyor drive and ultimately drives the conveyor drive through this frictional force. In both cases, this slippage creates an undesirable wear effect on the surfaces of the conveyed object and the conveyor drive and results in an unfavourable power transmission between the conveyor drive and the conveyed object. By reducing the slip, this disadvantage can be reduced or completely avoided.

A basic distinction is made between static friction and sliding friction. In the case of static friction, there is no or practically no relative movement between the conveyor drive and the conveyed object, i.e. the conveyor drive speed is equal to the conveyed object speed. In typical roller drives, this is expressed in such a way that the circumferential speed of the motor-driven conveying roller corresponds to the horizontal conveying speed of the conveyed object. With sliding friction, on the other hand, there is a relative speed between the conveyor drive and the conveyed object. In principle, the transmittable force with sliding friction is lower than the transmittable force with static friction. Accordingly, it is preferred if the slip between the conveyor drive and the conveyed object is reduced to such an extent that instead of a previously established sliding friction between the conveyor drive and the conveyed object, a static friction is set between the conveyor drive and the conveyed object in the second or third conveyor zone, i.e. there is no difference between the conveyor drive speed and the conveyed object speed.

It is even more preferred if the conveyor line comprises a plurality of conveyor zones with conveyor drives and a plurality of control units for controlling the conveyor drives, the first control unit being designed to transmit the first parameter of conveyed object to all control units. According to this advanced form, the first parameter of conveyed object is transmitted to all control units contained in the conveyor device, so that these control units as a whole can set and thus optimise one or more conveyor parameters on the basis of this parameter of conveyed object. In principle, an optimisation of the conveying along the entire conveyor line can be effected in this way, starting from a first conveyor zone. It is to be understood that conveyor signals detected in subsequent conveyor zones and parameters of conveyed object generated therefrom can also preferably be transmitted to all, or at least to all, downstream conveyor zones in order to be able to carry out an optimisation over the entire remaining conveyor line of the conveyed object. However, according to the invention, numerous variants of this are also conceivable, which depend in particular on the extent to which conveyor signals are detected in the individual conveyor zones. For example, a parameter of conveyed object can only be transmitted to the two, three, four further, directly adjacent downstream control units of the conveyor zones in order to carry out a corresponding optimised setting of conveyor parameters in these conveyor zones. This can be combined in particular with a detection of a conveyor signal in every second, every third, every fourth conveyor zone, so that the control of the conveyance of the conveyed object is characterised by a regularly recurring detection of a conveyor signal, the forwarding of which as a parameter of conveyed object to a certain number of control units of subsequent conveyor zones, wherein the number of conveyor zones which receive a parameter of conveyed object and optimise a conveyor parameter from this corresponds to the interval of the conveyor zones in which the conveyor signals are received.

Another aspect of the invention is a method for controlling a conveyor device for conveying conveyed objects along a conveyor line, comprising the steps of: conveying the conveyed object through a first conveyor zone, which represents a first segment of the conveyor line, by means of a first conveyor drive, subsequently conveying the conveyed object through a second conveyor zone, which represents a second segment of the conveyor line, by means of a second conveyor drive, detecting a first conveyor parameter in a first control unit which controls the first conveyor drive, determining a first parameter of conveyed object from the first conveyor parameter, setting a second conveyor parameter selected from: second conveying speed, second conveying acceleration or delay, second conveying duration as a function of the first parameter of conveyed object, and controlling the second conveyor drive with the second parameter of conveyed object.

The method can in particular be carried out with a conveyor device of the type described above, and the properties, advantages and process sequences explained above are in particular also applicable to the method according to the invention.

The method can be continued by the steps of: transmitting the conveyor signal with a drive signal included therein from the first conveyor drive selected in particular from: a maximum rotational speed of the conveyor drive, an average rotational speed of the conveyor drive, a rotational speed alteration rate over time, a rotational speed alteration rate velocity over time, a maximum drive energy of the conveyor drive, an average drive energy of the conveyor drive, a speed of alteration rate of the drive energy of the conveyor drive over time, a rate of alteration velocity of the drive energy of the conveyor drive over time.

The method can be continued by the steps of: detecting the first conveyor signal by a conveyor sensor in the first conveyor zone, in particular by detecting a position, speed and/or acceleration of the conveyed object in the first conveyor zone, and transmitting the conveyor parameter with a sensor signal describing the position, speed and/or acceleration of the conveyed object in the first conveyor zone.

13

14

The method can be continued by the steps: transmitting the first parameter of conveyed object to the second control unit before the conveyed object has completely left the first conveyor zone.

The method can be continued by the steps: transmitting the first conveying behaviour parameter to a third control unit arranged downstream of the second conveyor zone, and/or receiving a second conveying signal from the second conveyor zone in the second control unit, determining a second conveying behaviour parameter describing the conveying behaviour of this conveyed object in the second conveyor zone and transmitting this second conveying behaviour parameter to a third control unit, the third control unit controlling a conveyor drive in a third conveyor zone with third conveying behaviour parameters which are selected from: third conveying speed, third conveying acceleration or deceleration, third conveying duration, receiving the first and/or second parameter of conveyed object in the third control unit, setting at least one of the third conveying parameters as a function of the first parameter of conveyed object and/or the second parameter of conveyed object, and conveying the conveyed object with this third parameter of conveyed object in the third conveyor zone.

The method can be continued by the steps of: comparing the first and the second parameter of conveyed object, in particular forming the difference between the first and the second parameter of conveyed object, determining an alteration parameter of conveyed object on the basis of the comparison or the difference and, if necessary, transmitting the alteration parameter of conveyed object to the third control unit, and setting a third parameter of conveyed object as a function of the alteration parameter of conveyed object and conveying the conveyed object with this third parameter of conveyed object in the third conveyor zone.

The method may be advanced by describing in the first or second parameter of conveyed object a length of the conveyed object in a direction extending along the conveyor line, a mass or weight of the conveyed object, and/or a coefficient of friction between a bearing surface of the conveyed object on the first or second conveyor drive and the first or second conveyor drive.

The method can be continued by the steps of: setting the second conveyor parameter such that a slip between the second conveyor drive and the conveyed object in the second conveyor zone is less than a slip between the first conveyor drive and the conveyed object in the first conveyor zone, and/or setting the third conveyor parameter such that a slip between the third conveyor drive and the conveyed object in the third conveyor zone is less than a slip between the second conveyor drive and the conveyed object in the second conveyor zone.

The method can be continued by the steps: transmitting the first parameter of conveyed object to a plurality of control units for controlling conveyor drives of a plurality of conveyor zones in the conveyor line, respectively setting a conveyor parameter in the control units, and respectively controlling the conveyor drives in the conveyor zones with the set conveyor parameter.

BRIEF DESCRIPTION OF THE DRAWINGS

Preferred embodiments are explained with reference to the accompanying figures. It shows FIG. 1 a schematic view of a conveyor line consisting of three conveyor zones according to a first preferred embodiment of the invention.

DETAILED DESCRIPTION OF THE PREFERRED EMBODIMENTS

Figure 1:
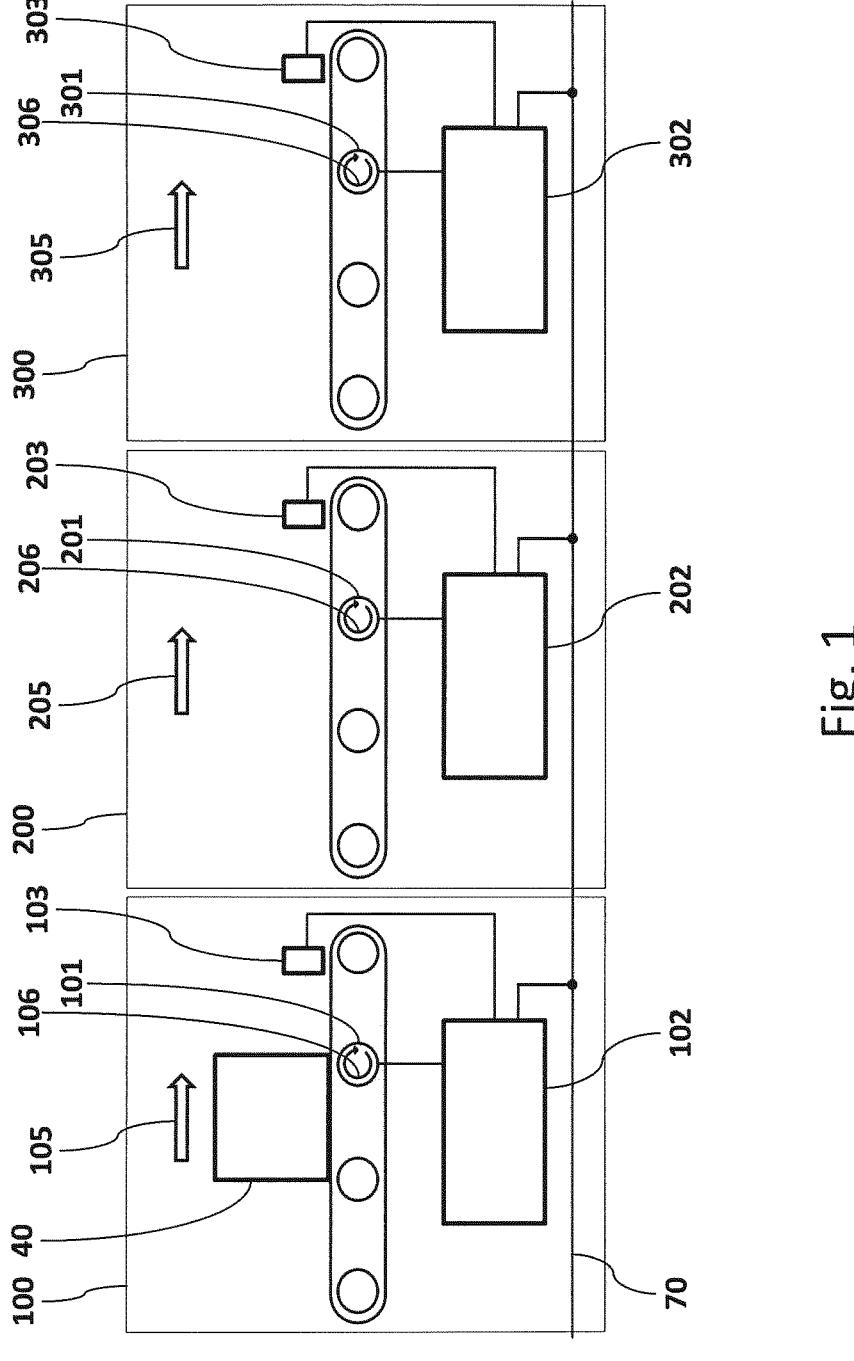

FIG. 1 shows a section of a conveyor device consisting of a total of three conveyor zones 100-300. The conveyor zones 100-200 and the conveyor zones 200-300 are directly adjacent and form a conveyor line.

Each conveyor zone 100-300 contains a conveyor drive 101-301 which drives the idle rollers of the conveyor zone via belts and thus conveys the conveyed object 40. The conveying direction 105-305 is determined by the direction of rotation 106-306 of the conveyor drives 101-301. The direction of rotation is configured so that the conveyed object is conveyed downstream. Each conveyor drive 101, 201, 301 is connected to a corresponding control unit 102, 202, 302 in terms of signalling by connecting a signal and voltage supply line with a motor connection plug arranged thereon into a motor connection socket on the corresponding control unit.

Each conveyor zone 100-300 has a sensor 103-303 mounted downstream of the centre of the conveyor zone. These sensors are arranged in such a way that the presence of a transport material in the outlet area of the individual conveyor zones can be detected with them. Each sensor 103-303 is connected to the corresponding control unit 102-302 in terms of signalling by connecting a signal and power supply line with a sensor connector arranged thereon into a sensor connector socket on the corresponding control unit.

Data can be exchanged between the control units themselves by means of a bus communication line 70.

Figure 2:
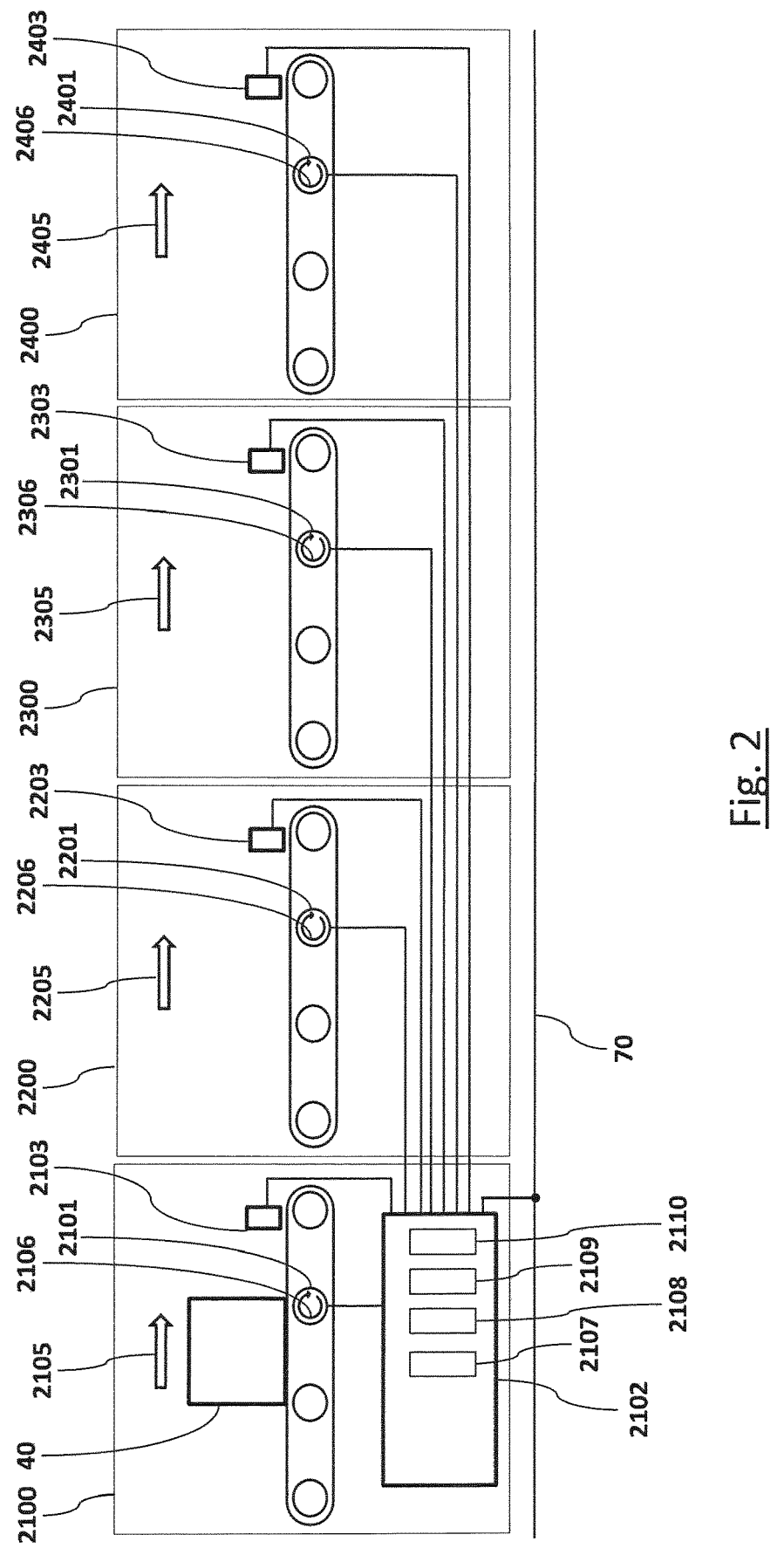
FIG. 2 a schematic view of a conveyor line consisting of a control unit with connection sockets for four conveyor zones according to a second preferred embodiment of the invention.

FIG. 2 depicts a second embodiment of a conveyor device according to the invention, in which a central control unit 2102 controls a plurality of conveyor zones 2100, 2200, 2300, 2400, the control being performed by four virtual control units 2107-2110 implemented in the control unit. The control units 2107-2110 evaluate signals from four sensors 2103, 2203, 2303, 2403. The control units 2107-2110 control four conveyor drives 2101, 2201, 2301, 2401 in the individual conveyor zones by activating or deactivating these conveyor drives depending on the signals from the sensors 2103, 2203, 2303, 2403. The control units in the central control unit control the direction of rotation 2106, 2206, 2306, 2406 of the conveyor drives in order to convey a transport material 40 downstream in conveying direction 2105-2405. The control units 2107-2110 can transmit data between each other via a, in particular internal, data connection such as, for example, a circuit board with line tracks on which the control units are placed, which is connected to a central bus communication line 70. In this embodiment example, an internal data connection within the central control unit may represent the signal transmission path between the individual control units. The signal transmission path, like the control units, can be virtual, so that in particular a communication function between functional units within the central control unit takes over the task of a signal transmission path formed by hardware.

Figure 3:
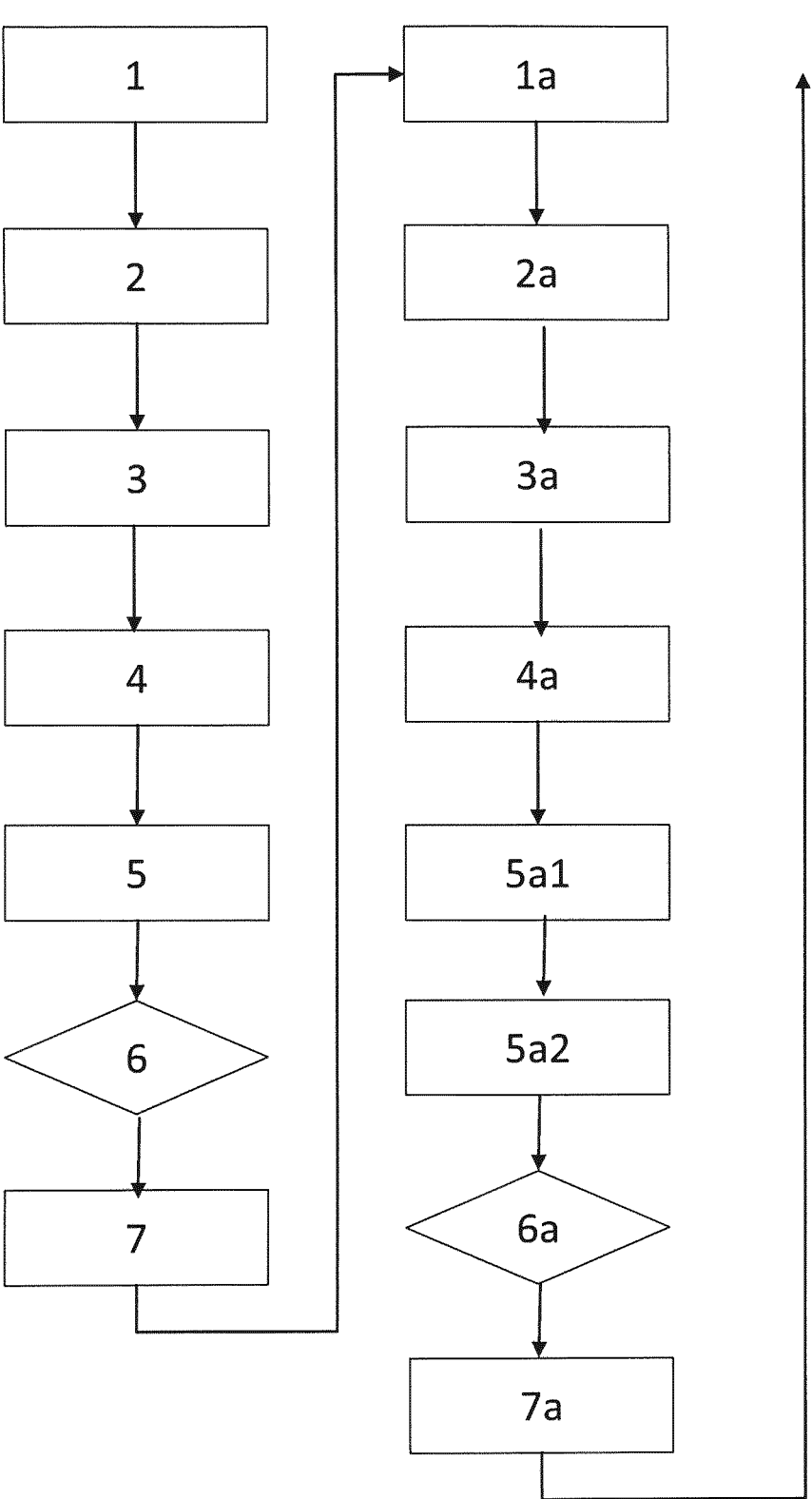
FIG. 3 an exemplary flow diagram of the conveyor device control.

FIG. 3 shows a control sequence for conveying a conveyed object along a conveyor line. It should be understood that this control sequence can be executed both in the conveyor device according to FIG. 1 and in the conveyor device according to FIG. 2. The difference that arises with regard to data transmission is merely the transmission of signals between the external control units in the embodiment according to FIG. 1 and the transmission of the same signals within the central control unit between the virtual control units integrated there in the embodiment according to FIG. 2.

The control sequence begins with the conveyed object being conveyed in the first conveyor zone in step 1. A conveyor signal is detected in the first conveyor zone in step 2. This conveyor signal can be detected from the conveyor drive or from the conveyor sensor and characterises a conveying behaviour of the conveyed object in the first conveyor zone. The conveyor signal is transmitted to the first control unit in step 3 and a parameter of conveyed object is formed from this conveyor signal in step 4. This parameter of conveyed object can correspond to the conveyor signal or can be a signalling processing of the conveyor signal. In particular, if the conveyor signal consists of or comprises a signal value of the conveyor drive and a signal value of the conveyor sensor, signal processing in terms of signalling can be advantageous in order to determine, for example, a detected slip of the conveyed object in the first conveyor zone.

The first parameter of conveyed object is then sent to the second control unit in step 5, which controls a second conveyor zone located downstream of the first conveyor zone.

The second control unit checks in step 6 whether the parameter of conveyed object gives reason to change one of the second conveyor parameters. The second conveyor parameters, with which the conveyor drive in the second conveyor zone is controlled, have been programmed in advance to a normal value in the second control unit. If test step 6 shows that the parameter of conveyed object signals an unfavourable conveying situation in the first conveyor zone that needs to be optimised, one or more second conveyor parameters are modified accordingly by the second control unit. This can be, for example, a reduction of the acceleration value of the conveyor drive if slippage has been detected in the first conveyor zone when accelerating the conveyed object. This can also be, for example, an extension of the conveying duration with a simultaneous reduction of the conveying force in order to generate a lower energy load peak and achieve the same acceleration of the conveyed object in the case of a parameter of conveyed object that characterises a long conveyed object.

In step 7, the second control unit then controls the second conveyor drive with this modified conveyor parameter. In step 1a, the same conveyed object that has entered the second conveyor zone is now conveyed in the second conveyor zone by the second conveyor drive with these conveyor parameters. Here, too, a conveyor signal is detected in the conveyor zone in step 2a and transmitted to the second control unit in step 3a, which uses it to form a parameter of conveyed object in step 4a. This second parameter of conveyed object is transmitted to a third control unit in step 5a1.

The third control unit further receives the first parameter of conveyed object in a step 5a2 and can then compare the first and the second parameter of conveyed object with each other in a test step 6a on the one hand and, if necessary, form a difference therefrom in order to determine whether a change in the parameters of conveyed object has taken place between the first and the second conveyor zone. In test step 6a, the second parameter of conveyed object and/or the first parameter of conveyed object can furthermore be checked in an absolute manner by the third control unit in order to determine whether the absolute first or second parameter of conveyed object gives rise to the modification of a third parameter of conveyed object with which a third conveyor drive in a third conveyor zone is controlled by the third control unit. As a result of this check, the third conveyor drive is then controlled with a possibly modified third conveyor parameter in a step 7a. The conveyed object is then conveyed there by the third conveyor drive in the same way as before when the third conveyor zone is reached. The above steps are repeated with respect to the fourth and each subsequent conveyor zone.

With the process sequence according to the invention and the conveyor device according to the invention, a learning conveyor device is thus provided which, starting from a first conveyor zone located at the beginning of the conveyor line, provides information on the conveying behaviour of the conveyed object to subsequent conveyor zones, in which conveying is optimised on the basis of this detected conveying behaviour. At the same time, changes in the conveying behaviour of the conveyed object along the conveyor line can also be detected in real time and the conveyance of the conveyed object can be adjusted and optimised accordingly.

| LIST OF REFERENCE NUMERALS | |
| --- | --- |
| 100, 200, 300 | conveyor zone |
| 101, 201, 301 | conveyor drive |
| 102, 202, 302 | control unit |
| 103, 203, 303^ | sensor |
| 2100, 2200, 2300 | conveyor zone |
| 2102 | central control unit |
| 2101, 2201, 2301, 2401 | conveyor drive |
| 2103, 2203, 2303, 2403 | sensor |
| 2106, 2206, 2306, 2406 | direction of rotation |
| 2105, 2205, 2305, 2405 | conveying direction |
| 2107, 2108, 2109, 2110 | virtual control unit |
| 40 | conveyed object |
| 70 | bus communication line |

The invention claimed is:

1. A conveyor device for conveying conveyed objects (40) along a conveyor line comprising:

a first conveyor zone (100, 2100) which constitutes a first segment of the conveyor line and which has a first conveyor drive (101, 2101) for generating a driving or braking force on a conveyed object (40) located in the first conveyor zone, a first control unit (102, 2107) which is connected to the first conveyor drive (101, 2101) in terms of signaling and is designed to control the first conveyor drive (101, 2101) with first conveyor parameters selected from:

first conveying speed, first conveying acceleration or conveying deceleration, first conveying duration, a second conveyor zone (200, 2200) arranged within the conveyor line downstream of the first conveyor zone (100, 2100) and constituting a second segment of the conveyor line, and having a second conveyor drive (201, 2201) for generating a driving or braking force on a conveyed object (40) located in the second conveyor zone (200, 2200), a second control unit (202, 2108) connected in terms of signaling to the second conveyor drive (201, 2201) and adapted to control the second conveyor drive (201, 2201) with second conveyor parameters selected from:

second conveying speed,
second conveying acceleration or deceleration
second conveying duration,
a signal transmission path (70) between the first and
second control units (102, 2107; 202, 2108),
characterised in, that
the first control unit (102, 2107) is designed to receive a
conveyor signal from the first conveyor zone (**100,
2100**) detected during the conveyance of a conveyed
object through the first conveyor zone, to process the
conveyor signal and to determine therefrom a first
parameter of conveyed object describing the conveying
behavior of this conveyed object in the first conveyor
zone and to transmit this first parameter of conveyed
object to the second control unit (202, 2108) via the
signal transmission path (70), and
the second control unit (202, 2108) is designed to receive
the first parameter of conveyed object from the first
control unit (102, 2107) via the signal transmission
path (70) and to set at least one of the second conveyor
parameters as a function of this first parameter of
conveyed object and to convey the conveyed object
with this second conveyor parameter in the second
conveyor zone (200, 2200), and
further characterized in that
the second control unit is adapted to adjust the second
conveyor parameter such that a slip between the second
conveyor drive and the conveyed object in the second
conveyor zone is less than a slip between the first
conveyor drive and the conveyed object in the first
conveyor zone, and/or
the third control unit is adapted to adjust the third con-
veyor parameter so that a slip between the third con-
veyor drive and the conveyed object in the third con-
veyor zone is less than a slip between the second
conveyor drive and the conveyed object in the second
conveyor zone.

2. Conveyor device according to claim 1, characterised in
that the conveyor signal comprises a drive signal from the
first conveyor drive, in particular selected from:
a maximum rotational speed of the conveyor drive,
an average rotational speed of the conveyor drive,
a speed of alteration rate of the rotational speed over time,
a maximum drive energy of the conveyor drive,
an average drive energy of the conveyor drive,
an alteration rate of the drive energy of the conveyor drive
over time,
a speed of alteration rate of the drive energy of the
conveyor drive over time.

3. Conveyor device according to claim 1, characterised in
that the first conveyor zone comprises a conveyor sensor
which is designed to detect a position, speed and/or accel-
eration of the conveyed object in the first—conveyor zone,
and the conveyor parameter is
the position,
the speed and/or
the acceleration
of the conveyed object in the first conveyor zone.

4. Conveyor device according to claim 1, characterised in
that the first control unit is adapted to transmit the first
parameter of conveyed object to the second control unit
before the conveyed object has completely left the first
conveyor zone.

5. Conveyor device according to claim 1, characterised by
a third conveyor zone arranged downstream of the second
conveyor zone and comprising a third conveyor drive
and a third control unit which is connected to the first and/or the second control unit via a second signal
transmission path and is adapted to control the third
conveyor drive with third conveyor parameters selected
from:
third conveying speed,
third conveying acceleration or deceleration,
third conveying duration
and
characterised in that
the first control unit is designed to transmit the first
parameter of conveyed object to the third control unit
via the second signal transmission path and/or
the second control unit is designed to receive a
conveyor signal from the second conveyor zone
detected during the conveying of a conveyed
object through the second conveyor zone and to
determine therefrom a second parameter of con-
veyed object describing the conveying behavior of
this conveyed object in the second conveyor zone
and to transmit this second parameter of conveyed
object to the third control unit via the signal
transmission path,
the second control unit is designed to receive the
parameter of conveyed object from the first con-
trol unit and/or the second parameter of conveyed
object from the second control unit via the signal
transmission path and to set at least one of the
third conveyor parameters as a function of the
parameter of conveyed object and/or the second
parameter of conveyed object and to convey the
conveyed object with this third conveyor param-
eter in the third conveyor zone.

6. Conveyor device according to claim 1, characterised in
that the first or the second parameter of conveyed object
describes
a length of conveyed object in a direction extending along
the conveyor line,
a mass or weight of the conveyed object, and/or
a coefficient of friction between a bearing surface of the
conveyed object on the first or second conveyor drive
and the first or second conveyor drive.

7. Conveyor device according to claim 1, characterized in
that the conveyor line comprises a plurality of conveyor
zones with conveyor drives and a plurality of control
units for controlling the conveyor drives, and
that the first control unit is adapted to transmit the first
parameter of conveyed object to all control units.

8. A conveyor device for conveying conveyed objects (40)
along a conveyor line, the conveying device comprising:
a first conveyor zone (100, 2100) which constitutes a first
segment of the conveyor line and which has a first
conveyor drive (101, 2101) for generating a driving or
braking force on a conveyed object (40) located in the
first conveyor zone,
a first control unit (102, 2107) which is connected to the
first conveyor drive (101, 2101) in terms of signaling
and is designed to control the first conveyor drive (**101,
2101**) with first conveyor parameters selected from:
first conveying speed,
first conveying acceleration or conveying deceleration,
first conveying duration,
a second conveyor zone (200, 2200) arranged within the
conveyor line downstream of the first conveyor zone
(100, 2100) and constituting a second segment of the
conveyor line, and having a second conveyor drive (201, 2201) for generating a driving or braking force on a conveyed object (40) located in the second conveyor zone (200, 2200), a second control unit (202, 2108) connected in terms of signaling to the second conveyor drive (201, 2201) and adapted to control the second conveyor drive (201, 2201) with second conveyor parameters selected from:

second conveying speed, second conveying acceleration or deceleration second conveying duration, a signal transmission path (70) between the first and second control units (102, 2107; 202, 2108), characterised in, that the first control unit (102, 2107) is designed to receive a conveyor signal from the first conveyor zone (100, 2100) detected during the conveyance of a conveyed object through the first conveyor zone, to process the conveyor signal and to determine therefrom a first parameter of conveyed object describing the conveying behavior of this conveyed object in the first conveyor zone and to transmit this first parameter of conveyed object to the second control unit (202, 2108) via the signal transmission path (70), and the second control unit (202, 2108) is designed to receive the first parameter of conveyed object from the first control unit (102, 2107) via the signal transmission path (70) and to set at least one of the second conveyor parameters as a function of this first parameter of conveyed object and to convey the conveyed object with this second conveyor parameter in the second conveyor zone (200, 2200), and further characterized in that the second control unit is designed to determine the difference between the first and the second conveyed object parameter, to determine an alteration parameter of conveyed object on the basis of the difference and to transmit the alteration parameter of conveyed object to the third control unit, or the third control unit is designed to determine the difference between the first and the second parameter of conveyed object, to determine an alteration parameter of conveyed object on the basis of the difference and in that the third control unit is designed to set at least one of the third conveyor parameters as a function of the alteration parameter of conveyed object and to convey the conveyed object with this third conveyor parameter in the third conveyor zone.

9. A method for controlling a conveyor device for conveying conveyed objects along a conveyor line, the method comprising the steps:

conveying the conveyed object (40) through a first conveyor zone (100, 2100), which constitutes a first segment of the conveyor line, by means of a first conveyor drive (101, 2101), subsequently conveying the conveyed object (40) through a second conveyor zone (200, 2200), which constitutes a second segment of the conveyor line, by means of a second conveyor drive (201, 2201), detecting a first conveyor parameter in a first control unit (102, 2107) which controls the first conveyor drive (101, 2101), —determine a first parameter of conveyed object from the first conveyor parameter, characterised by the steps setting a second conveyor parameter selected from:

second conveying speed, second conveying acceleration or conveying deceleration, second conveying duration as a function of the first parameter of conveyed object and controlling the second conveyor drive (201, 2201) with the second conveyor parameter, and further characterised by the steps adjusting the second conveyor parameter such that a slip between the second conveyor drive and the conveyed object in the second conveyor zone is less than a slip between the first conveyor drive and the conveyed object in the first conveyor zone, and/or setting a third conveyor parameter so that a slip between a third conveyor drive and the conveyed object in the third conveyor zone is less than a slip between the second conveyor drive and the conveyed object in the second conveyor zone.

10. Method according to claim 9, characterized by:

transmitting the conveyor signal with a drive signal included therein from the first conveyor drive, which is selected in particular from:

a maximum rotational speed of the conveyor drive, an average rotational speed of the conveyor drive, a speed of alteration rate of the conveyor drive over time, a maximum drive energy of the conveyor drive, an average drive energy of the conveyor drive, an alteration rate of the drive energy of the conveyor drive over time, an alteration rate speed of the drive energy of the conveyor drive over time.

11. Method according to claim 9, characterised by:

detection of the first conveyor signal by a conveyor sensor in the first conveyor zone, in particular by detecting a position, speed and/or acceleration of the conveyed object in the first conveyor zone, and transmitting the conveyor parameter with a sensor signal describing the position, speed and/or acceleration of the conveyed object in the first conveyor zone.

12. Method according to claim 9, characterised by transmitting the first parameter of conveyed object to the second control unit before the conveyed object has completely left the first conveyor zone.

13. Method according to claim 9, characterised by transmitting the first parameter of conveyed object to a third control unit arranged downstream of the second conveyor zone, and/or receiving a second conveyor signal from the second conveyor zone in the second control unit, determining a second parameter of conveyed object describing the conveying behavior of this conveyed object in the second conveyor zone, and transmitting this second parameter of conveyed object to a third control unit, the third control unit controlling a conveyor drive in a third conveyor zone with third conveyor parameters selected from:

third conveying speed, third conveying acceleration or deceleration, third conveying duration, receiving the first and/or second parameter of conveyed object in the third control unit, setting at least one of the third conveyor parameters as a function of the first parameter of conveyed object and/or the second parameter of conveyed object and conveying the conveyed object with this third conveyor parameter in the third conveyor zone.

14. Method according to claim 9, characterized in that in the first or second parameter of conveyed object a length of the conveyed object in a direction extending along the conveyor line, a mass or weight of the conveyed object, and/or a coefficient of friction between a bearing surface of the conveyed object on the first or second conveyor drive and the first or second conveyor drive is described.

15. Method according to claim 9, characterized by transmitting the first parameter of conveyed object to a plurality of control units for controlling conveyor drives of a plurality of conveyor zones in the conveyor line, setting one conveyor parameter in the control units, and controlling the conveyor drives in the conveyor zones with the set conveyor parameter.

16. A method for controlling a conveyor device for conveying conveyed objects along a conveyor line, the method comprising the steps:

conveying the conveyed object (40) through a first conveyor zone (100, 2100), which constitutes a first segment of the conveyor line, by means of a first conveyor drive (101, 2101), subsequently conveying the conveyed object (40) through a second conveyor zone (200, 2200), which constitutes a second segment of the conveyor line, by means of a second conveyor drive (201, 2201), detecting a first conveyor parameter in a first control unit (102, 2107) which controls the first conveyor drive (101, 2101), —determine a first parameter of conveyed object from the first conveyor parameter, characterised by the steps setting a second conveyor parameter selected from:

second conveying speed, second conveying acceleration or conveying deceleration, second conveying duration as a function of the first parameter of conveyed object and controlling the second conveyor drive (201, 2201) with the second conveyor parameter, and further characterized by transmitting the first parameter of conveyed object to a third control unit arranged downstream of the second conveyor zone, and/or receiving a second conveyor signal from the second conveyor zone in the second control unit, determining a second parameter of conveyed object describing the conveying behavior of this conveyed object in the second conveyor zone, and transmitting this second parameter of conveyed object to a third control unit, the third control unit controlling a conveyor drive in a third conveyor zone with third conveyor parameters selected from:

third conveying speed, third conveying acceleration or deceleration, third conveying duration, receiving the first and/or second parameter of conveyed object in the third control unit, setting at least one of the third conveyor parameters as a function of the first parameter of conveyed object and/or the second parameter of conveyed object and conveying the conveyed object with this third conveyor parameter in the third conveyor zone, and further characterised by comparing the first and second parameters of conveyed object, in particular forming the difference between the first and second parameters of conveyed object;

determining an alteration parameter of conveyed object based on the comparison or difference and if applicable, transmit the alteration parameter of conveyed object to the third control unit, and setting of a third conveyor parameter depending on the alteration parameter of conveyed object and conveying the conveyed object with this third conveyor parameter in the third conveyor zone.

* * * * *